United States Patent [19]

Mizukawa et al.

[11] 4,065,802
[45] Dec. 27, 1977

[54] INVERTER CIRCUIT FOR INDUCTION HEATING COOKING OVENS WITH A PROTECTION DEVICE

[75] Inventors: Takumi Mizukawa, Neyagawa; Masatatsu Nakamura, Higashimikunimachi; Kouzi Funakoshi, Osaka; Hideyuki Kominami, Takatsuki, all of Japan

[73] Assignee: Matsushita Electric Industrial Co., Ltd., Kadoma, Japan

[21] Appl. No.: 661,991

[22] Filed: Feb. 27, 1976

[30] Foreign Application Priority Data

Mar. 7, 1975   Japan .................................. 50-28530

[51] Int. Cl.² .......................................... H02H 7/122
[52] U.S. Cl. ....................................... 361/18; 361/86; 361/79; 361/100
[58] Field of Search .............. 317/27 R, 33 SC, 40 R; 219/10.77, 10.49, 249, 257, 258; 321/11, 12, 14, 4, 10, 45 C; 361/18, 79, 86, 87, 88, 91, 100

[56] References Cited

U.S. PATENT DOCUMENTS

| | | | |
|---|---|---|---|
| 3,069,526 | 12/1962 | Bremer et al. | 219/449 X |
| 3,775,577 | 11/1973 | Peters, Jr. | 219/10.77 X |
| 3,786,220 | 1/1974 | Harnden, Jr. | 219/10.49 |
| 3,820,005 | 6/1974 | Steigerwald | 219/10.77 X |
| 3,821,509 | 6/1974 | Amagami et al. | 219/10.49 X |
| 3,832,621 | 8/1974 | Kornrumpf et al. | 219/10.77 X |

Primary Examiner—J D Miller
Assistant Examiner—Patrick R. Salce
Attorney, Agent, or Firm—Stevens, Davis, Miller & Mosher

[57] ABSTRACT

A protection device for a thyristor inverter circuit of an induction heating cooking oven wherein commutation failure of a thyristor is detected by determining that the conduction period of the thyristor is outside a predetermined period or that a voltage applied to the thyristor is outside of a predetermined magnitude. The protection device deactuates the inverter to prevent breakdown of the thyristor and reduces the number of operations of the circuit breaker which is a final protection device. Additionally provided are linked switch actuator apparatus for placing a switch for actuating a thyristor control circuit in a state in which it is always actuated in advance of the actuation of a switch for a heating coil in order to prevent occurrance of a transient high voltage due to the switching of an inductive load in the inverter circuit, and an overheating protection circuit for detecting an abnormal temperature rise of the heating coil and an abnormal load condition to deactuate the inverter.

6 Claims, 14 Drawing Figures

INVERTER CIRCUIT FOR INDUCTION HEATING COOKING OVENS WITH A PROTECTION DEVICE

The present invention relates to an inverter circuit, and more particularly to a protection device for a thyristor inverter circuit.

It is an object of the present invention to provide an inverter circuit for an induction heating cooking oven having a protection device which prevents the breakdown of components in the inverter circuit, particularly semiconductor devices, by a transient high voltage due to an abrupt change in a load or commutation failure of a thyristor in the inverter circuit.

The foregoing and other objects, features and advantages of the present invention will become more apparent from the following detailed description of the preferred embodiments of the invention when taken in conjunction with the accompanying drawings, in which.

The embodiments of the present invention will now be described. The first feature of the invention is first explained.

An induction heating apparatus usually employs an inverter which operates at a high frequency such as several of kHz to several tens kHz so that when a thyristor of the inverter, such as an SCR fails to commutate owing to a variation of the load condition of an object to be heated, the SCR may be turned off from its on state by an oscillating current. The OFF voltage of the SCR after commutation failure is sufficiently high to cause it to exceed the breakdown voltage of the SCR so that the SCR may be destroyed. In order to avoid such breakdown, an SCR which has a higher breakdown voltage and is capable of operating in a high frequency region may be used but the manufacture of such an SCR is very difficult under present day technology. Furthermore, since the current which flows when the SCR completely fails to commutate has to be blocked by a circuit breaker within a period shorter than the surge current rating of the SCR, the circuit breaker must be of the high speed type, such as several milliseconds operation speed. However, since such a high speed mechanical device has a short durability, the inverter should be designed to minimize the number of operations of the circuit breaker to protect the SCR. In the light of the above, according to the present invention, the fact that the ON period or conduction period of the SCR is longer when the SCR fails to commutate than in normal operation is effectively utilized to stop the oscillation of a gate pulse for deactuating the inverter under a stand-by state without opening the circuit breaker. However, it is not distinctly defined at which phase of the AC power supply the commutation failure will occur, and when it occurs near a peak phase (T/2) of the AC power supply, the OFF voltage of the SCR may exceed the breakdown voltage of the SCR. This problem can be resolved by detecting the OFF voltage of the SCR and in response thereto applying a D.C. current to the gate to turn on the SCR and block the circuit breaker. In this way, breakdown of the SCR can be prevented and the number of operations of the circuit breaker, which is the final protection means, can be reduced.

Figure 1:
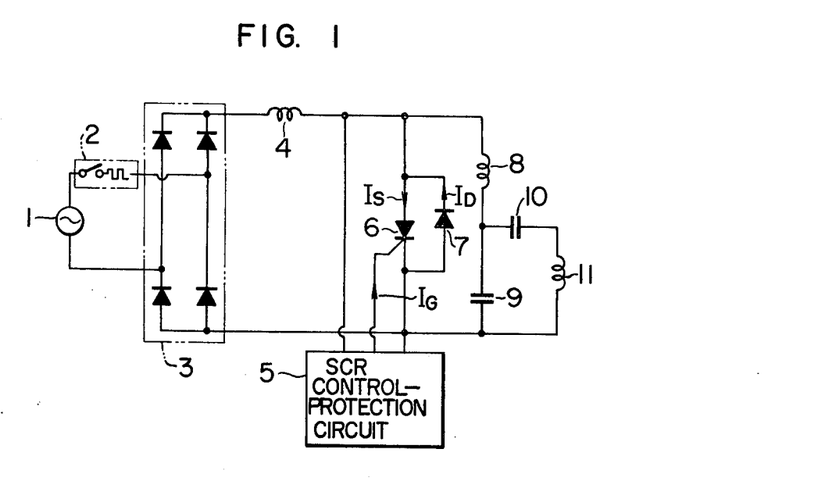
FIG. 1 shows a self-commutation parallel inverter circuit for illustrating the thyristor protection circuit of the present invention.
Figure 2:
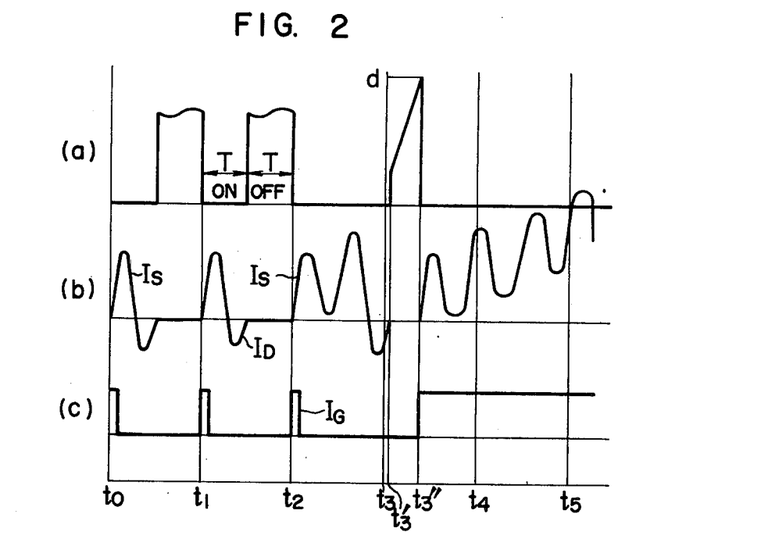
FIGS. 2 and 3 show waveforms for illustrating commutation failure of the inverter circuit of FIG. 1.
Figure 3:
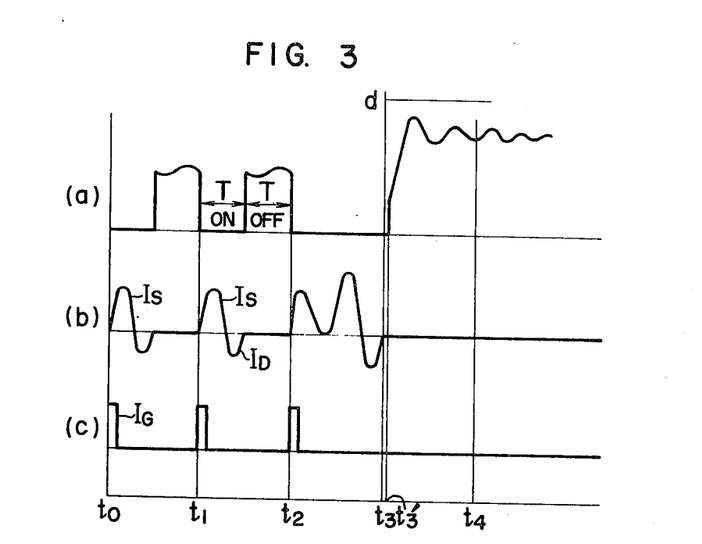

A self-commutation parallel inverter circuit shown in FIG. 1 and waveforms at various points of the inverter in case of the commutation failure shown in FIGS. 2 and 3 are now explained. The circuit shown in FIG. 1 includes a commercial power supply 1, a circuit breaker 2, a rectifying diode bridge 3, a current limiting inductor 4, an SCR control-protection circuit 5, an SCR 6, a recovery diode 7, a commutation inductor 8, a commutation capacitor 9, a filtering capacitor 10 and a heating coil 11. FIG. 2 shows waveforms at various points in the inverter of FIG. 1 when commutation failure of the SCR has occured near a peak phase and the OFF voltage of the SCR has exceeded a predetermined value. FIG. 3 shows waveforms when the OFF voltage of the SCR due to the commutation failure does not exceed the predetermined value. In FIGS. 2 and 3, waveform (a) show the anode voltage waveform of the SCR 6, waveform (b) the current $I_s$ through a SCR 6 and a current $I_D$ through the recovery diode 7, waveform (c) the gate pulse waveform, and line d the protection level of the SCR OFF voltage (hereinafter referred to as the protection level). $T_{ON}$ represents the ON period of the SCR 6, $T_{OFF}$ the OFF period of SCR 6 (the duration of which changes when commutation failure occurs), and $t_0$ the $t_5$ represent timing of the gate pulses.

The operation of the circuit is now explained with reference to the waveform charts. The period during which the inverter circuit of FIG. 1 operates normally is between time points $t_0$ and $t_2$ in FIGS. 2 and 3. The operation during this period is as follows: At $t_0$, when the SCR 6 is turned on by the gate pulse (c), a charge which has previously been stored in the commutation capacitor 9 produces an oscillating current through the commutation capacitor 9 and the commutation inductor 8, positive portions $I_s$ of this current flowing into the SCR 6 and negative portions $I_D$ flowing into the recovery diode 7, as shown by (b) in FIGS. 2 and 3. Because of the current $I_D$ through the recovery diode 7, the SCR 6 is reverse-biased and turned off so that the anode OFF voltage thereof rises. The commutation capacitor 9 remains charged until the next gate pulse arrives (at $t_1$), when the SCR 6 is turned on and the above operation is repeated.

As to the waveforms at the commutation failure after the time $t_2$, reference is made to FIG. 2 where the SCR OFF voltage exceeds the protection level $d$ due to commutation failure. At the time $t_2$, the gate pulse is applied and the SCR 6 is turned on. When, however, the current $I_D$ through the recovery diode 7 does not flow due to an abrupt change in the load, for example, or it flows only during a period which is shorter than the turn off time of the SCR 6, the SCR 6 is not turned off and the current $I_s$ through the SCR 6 begins to increase in an oscillatory manner. By the second cycle of the oscillating current the current $I_D$ through the recovery diode 7 flows because the resonant frequency of the filtering capacitor 10 of the inverter and the heating coil 11 substantially corresponds to the repetition frequency of the gate pulses. Because the current $I_D$ flows through the recovery diode 7, the SCR 6 is turned off and the anode voltage beings to rise (at $t_3'$ in FIG. 2). The SCR ON time $T_{ON}$ at this time is about twice as long as that in normal operation. In the present invention, the duration of this ON time $T_{ON}$ is detected to suppress the gate pulse (as will be described in detail with reference to FIG. 4). Therefore, the gate pulse does not occur at the time $t_3$. On the other hand, the anode voltage of the SCR 6 which has been turned off is superimposed on the remaining charge in the filtering capacitor 10 and the commutation capacitor 9, and when the anode off voltage of the SCR 6 reaches the level $d$ (at time $t_3''$) a D.C. current is forced to flow through the gate of the SCR 6 (as will be described in detail with reference to FIG. 4) to maintain the SCR 6 in its on state and block the circuit breaker 2.

Next, referring to FIG. 3 the case in which the anode OFF voltage of the SCR 6 due to commutation failure does not reach the protection level $d$ is explained. As described in connection with FIG. 2, when the ON period $T_{ON}$ of the SCR 6 is extended, the gate pulse is suppressed, the SCR 6 is turned off and the anode OFF voltage rises but it does not reach the protection level $d$ and the inverter is deactuated and maintains that state (after the time $t_3$ in FIG. 3). This state is referred to as stand-by state. In this state the inverter is supplied with a supply voltage but it does not oscillate.

Figure 4:
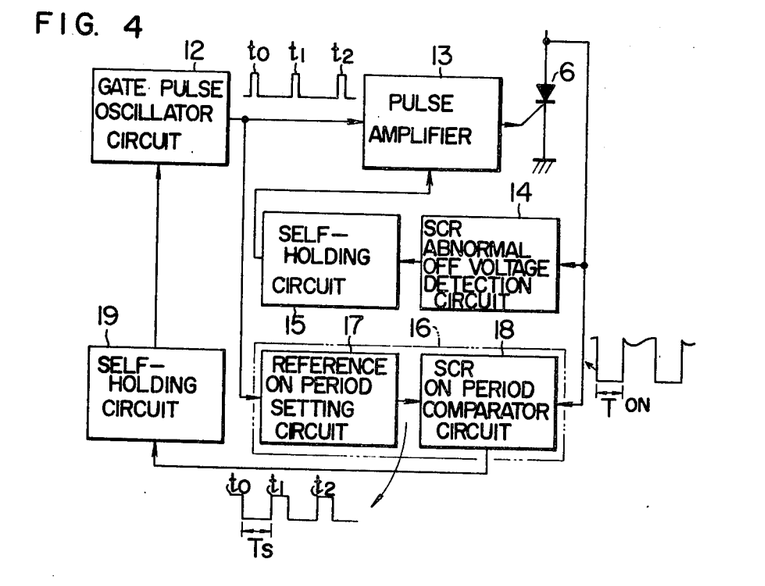
FIG. 4 shows a wiring diagram of the thyristor protection circuit of the present invention.

The SCR control protection circuit 5 shown in FIG. 1 is described in detail with reference to FIG. 4. The circuit shown in FIG. 4 includes the SCR 6 of the inverter circuit shown in FIG. 1, other electrical components of the inverter not being shown, a gate pulse oscillator circuit 12, a pulse amplifier 13, an SCR abnormal OFF voltage detection circuit 14, a self-holding circuit 15, an SCR ON period detection circuit 16, a reference ON period setting circuit 17, an SCR ON period comparator circuit 18 and a self-holding circuit or a timer circuit 19. Although no specific means is shown in the arrangement of FIG. 4, the gate pulse oscillator circuit 12 may be an astable multivibrator, the pulse amplifier 13 may be a switching circuit using transistors, the SCR abnormal OFF voltage detection circuit may be a compare circuit including a reference voltage circuit and a voltage comparator, the self-holding circuits 15 and 19 may be SCR's for a small signal input, the reference ON period setting circuit 17 may be a monostable multivibrator, the SCR ON period comparator circuit 18 may be a voltage comparator which detects time durations of voltage levels of the reference ON period $T_s$ and the SCR ON period $T_{ON}$, and the timer 19 may be an SCR timer or a monostable multivibrator.

The operation of the above arrangement is now explained. During the normal operation period $t_0$ to $t_2$ in FIGS. 2 and 3, the gate pulse oscillator circuit 12 produces a pulse waveform as shown in FIG. 4. Those gate pulses are applied to the input of the pulse amplifier 13, are amplified thereby, and flow into the gate of the SCR 6. As described in connection with the operation of the inverter of FIG. 1, the SCR 6 turns on and off at a fixed time interval. The output from the gate pulse oscillator circuit 12 is also applied to the reference ON period setting circuit 17 of the SCR ON period detection circuit 16. When the pulse $t_0$ is applied to the input, the reference ON period setting circuit 17 produces the reference ON period $T_s$ at the output thereof. The reference ON period $T_s$ is set to be slightly longer than the SCR ON period $T_{ON}$ during normal operation. Namely, the SCR ON period comparator circuit 16 is designed to produce an output when $T_{ON}$ is longer than $T_s$ and it does not produce the output during normal operation because the SCR ON period $T_{ON}$ is shorter than the reference ON period $T_s$. Thus, the self-holding circuit or timer circuit 19 is not actuated and the gate pulse oscillator circuit 12 continues to oscillate. On the other hand, since the anode OFF voltage of the SCR 6 is lower than the protection level $d$, the SCR abnormal OFF voltage detection circuit 14 does not produce an output and the self-holding circuit 15 is not activated.

After the time $t_2$ in FIG. 2, that is, when the SCR OFF voltage has exceeded the protection level at the commutation failure near the peak phase, the SCR ON period $T_{ON}$ is longer than the reference ON period $T_s$ owing to commutation failure of the SCR 6 so that the SCR ON period detection circuit 18 produces an output. This output activates the self-holding circuit 19 to continuously or temporarily stop the oscillation of the gate pulse oscillator circuit 12. As the SCR OFF voltage rises and reaches the protection level $d$, the SCR abnormal OFF voltage detection circuit 14 produces a detection output so that the self-holding circuit 15 self-holds to turn on the pulse amplifier 13 in a D.C. mode and apply a D.C. signal to the gate of the SCR 6 (at $t_3''$ in FIG. 2). Thus, the SCR 6 maintains its ON state and blocks the circuit breaker.

On the other hand, after the time $t_2$ in FIG. 3, that is, when the SCR OFF voltage does not reach the protection level at commutation failure near a zero phase, the same operation as in FIG. 2 is repeated until the ON period $T_{ON}$ of the SCR 6 is detected to suppress the oscillation of the gate pulse oscillation circuit 12. In this case, however, since the OFF voltage of the SCR does not reach the protection level $d$ although it rises, the SCR abnormal OFF voltage detection circuit 14 does not operate, the self-holding circuit 15 does not operate and the inverter stops in its stand-by state. Therefore, the gate pulse oscillator circuit 12 is stopped continuously or for a predetermined time interval by the self-holding circuit 19, and if the circuit 19 is a timer circuit the inverter is re-started after the elapse of the predetermined time.

As described above, the present invention prevents the breakdown by a dual protection circuit which detects the SCR ON period as well as the SCR OFF period to protect the SCR, thus providing positive protection to the SCR. When the circuit of the present invention is combined with a zero phase start-stop circuit for the inverter, or a so-called zero-volt switching circuit, the inverter can be stopped at its stand-by state when the SCR fails to commutate at the start by an abnormal load condition. Accordingly the number of operations of the circuit breaker is reduced and the reliability of the inverter circuit for use in an induction heating oven is enhanced.

A second feature of the present invention is now explained. In a circuit having an inductive load such as the inverter circuit used in the induction heating oven, when an abrupt change in a constant of the oscillator circuit occurs due to the switching or connection of the inductive load during oscillation, a transient high voltage is generated, which may injure components, particularly semiconductor devices such as SCRs. In the prior art, in order to avoid switching in the oscillator circuit, a power control system which can be continuously varied during oscillation has been employed. In this continuously variable power control system, there is a drawback in that, when a plurality of heating coils are connected, the outputs of the respective heating coils interfere with each other.

Figure 5:
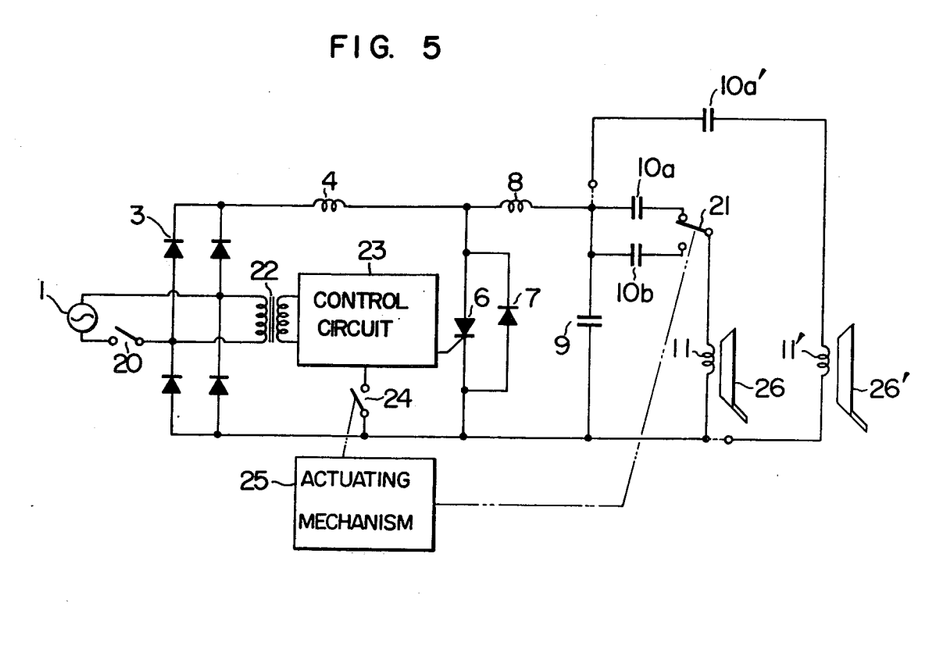
FIG. 5 is a circuit diagram showing another embodiment of the present invention.

In an embodiment shown in FIG. 5, a power supply rectifier 3 connected to a power supply through a power switch 20 is provided, to which a series circuit of a current limiting inductor 4 and an SCR 6 is connected in parallel, and a diode 7 is connected in opposed-parallel with the SCR 6. A series circuit of a commutation inductor 8 and a commutation capacitor 9 is also connected in parallel with the SCR 6. A heating coil 11 is series connected to either one of filtering capacitors 10a and 10b through a switch 21, and also connected in parallel with the commutation capacitor 9. Connected to a gate terminal of the SCR 6 is a control circuit 23 which is fed by a power transformer 22 connected across input terminals of the power supply rectifier 3. A switch 24 which is operated in linked relation with the switch 21 is connected to the control circuit 23, and the switches are linked by an actuating mechanism 25 which assures that switching of the switch 24 always occurs in advance of the switching of switch 21. Namely, the switch 24 breakes momentarily before switching of switch 21 and again makes after completion of the switching of switch 21.

When the power switch 20 is turned on, the inverter circuit oscillates resulting in power consumption in a pan 26 to be heated, which is located adjacent to the heating coil 11. In order to change the power being consumed by the pan 26, the filtering capacitor may be switched from 10a to 10b by the switch 21. In this case, if only switch 21 would be operated the components of the inverter, such as an SCR would be adversely affected by the transient voltage. By operating the actuating mechanism 25 such that the switch 24 in the control circuit 23 (shown externally of the circuit 23 in the drawing for convenience) is turned off in advance of the switching of the switch 21, the zero phase detection circuit in the control circuit 23 is operated to stop the oscillation at the zero phase of the power supply, and the switch 21 is turned off while the oscillation is stopped.

Figure 11A:
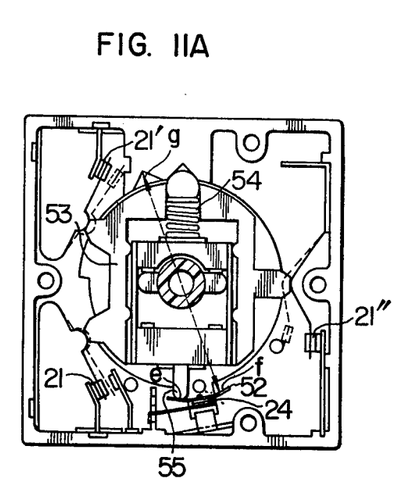
FIGS. 11A and 11B are elevation and cross sectional views respectively of an actuating mechanism.
Figure 11B:
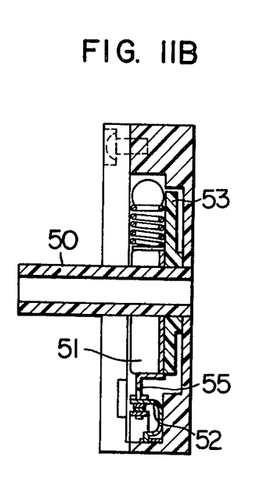

The control circuit 23 may comprise the gate pulse oscillator circuit 12, the pulse amplifier 13, the self-holding circuit 19 shown in FIG. 4, and an oscillation-suppression signal generator 38 shown in FIG. 13 to be explained later. The actuating mechanism 25 may be any structure which assures the switching of one of two switches in advance of the other, and an actuating mechanism as shown in FIGS. 11A and 11B may be used. With this actuating mechanism, the switch 21 is operated after the elapse of a period longer than a one-half wave period of the commercial power supply 1 since the switch 24 has been opened. The oscillation-suppression control switch 24 is normally on and turned off momentarily when the switch is operated to stop the oscillation of the inverter. Referring to FIGS. 11A and 11B, as a movable element 50 is rotated counterclockwise, a movable frame 51 rises upward releasing a lever 55 which pushes a movable spring 52 so that the switch 24 is opened. As the movable element 50 is further rotated, the movable frame 51 fully rises to its upper limit so that the torque exerted by the movable element 50 is conveyed to a driving element 53, which in turn, operates with its projection to switch the contact of the switch 21 (from the left contact to the right contact in the illustrated example) and stops along the dotted line $g - e$ (ball bearing rests at $g$). When the force having been applied to the movable element 50 is removed, the movable frame 51 falls downward by the action of a quick spring 54 and again pushes with the lever 55 the movable spring 52 (at point $f$) and the switch 24 is turned on. That is, as the movable element 50 is moved, the switch 24 is immediately turned off to stop the inverter at the next zero volt pulse, and thereafter the actuating mechanism establishes the time delay for switching the switch 21. In FIG. 11A, other switches 21' and 21" (opposite contacts are not shown) are shown besides the switch 21. These switches 21' and 21" are required when more than one heating coil is provided in order to use a suitable heating coil selectively.

As described above, according to the present invention, by the operation of only the actuation mechanism 25, the constants (inductance and/or capacitance) in the inverter can be easily changed to reduce the transient voltage due to the operation of the switch 21 and at the same time the zero phase oscillation start and the zero phase oscillation stop are accomplished, minimizing the influence by the transient voltage occuring when the oscillation starts or stops so that the components such as the SCR 6 can be positively protected.

Even when a plurality of heating coils are used, since the constants in the inverter can be easily changed in accordance with the present invention to sequentially change the capacitances of the filtering capacitors 10a, 10b, so that the voltage across the heating coil 11 is maintained at a fixed value, the power consumed by the pan 26 does not depend on the presence or absence of additional heating coil 11' and power interference between the heating coils does not occur.

A third feature of the present invention is now explained. In an induction heating cooking oven, if an empty pan is accidently placed in the oven and overheated, the heat from the pan, which is at very high temperature, is conveyed through a top plate on which the pan is mounted, and the temperature of the heating coil rises by heat radiation therefrom resulting in the deterioration of the insulation between the wires of the heating coil and finally causing a short-circuit therebetween. Accordingly it is necessary to regulate the power output of the oven by providing overheat protection means to prevent overheating of the empty pan and to protect the heating coil. The best way to detect the elevated temperature of the heating coil in a stable and simple manner in a detection section of the overheat protection means, is to build a thermistor in the heating coil. However this is very difficult from the stand point of the insulation between the thermistor and the coil and the manufacture thereof, and hence it is required to detect the temperature of the coil at a location outside the coil. Yet the location should be selected to be near the coil such that the temperature at that location has always a fixed relation to the temperature of the heating coil and the temperature detected will not be affected even when the position of the pan deviates somewhat from immediately above the heating coil.

Figure 6:
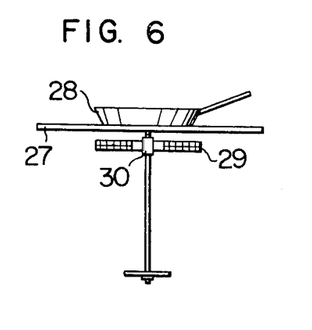
FIG. 6 is a schematic sectional view of an overheat detection means and a heating section of an induction heating cooking oven.
Figure 7:
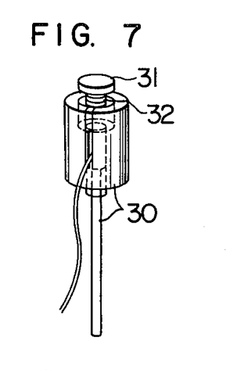
FIG. 7 is a perspective view showing the overheat detection means.

The present invention provides an overheat detection mechanism for the induction heating cooking oven which meets the above requirements. One embodiment of the present invention is now explained with reference to the drawings. In FIG. 6, a top plate 27 on which a cooking pan 28 is mounted is made of nonmagnetic material which is heat resistive and has a small thermal conductivity, such as ceramic glass. Mounted below the top plate 27 is a ring-shaped heating coil 29 having a hollow section, through which a supporting post 30 having its lower end fixed extends. At the upper end of the post 30 a heat reception element 31 having a spring 32 wound thereon as shown in FIG. 7, is mounted. The surface of the heat reception element 31 is smooth, and when it is urged toward the lower side of the top plate it is kept in close contact therewith by the action of the spring 32. The heat reception element 31 may be made of non-ferrous metal having a high thermal conductivity which is difficult to inductively heat, such as aluminum. A thermistor 33 (FIG. 8) is embedded in the heat reception element 31 to prevent overheating of the top plate 27.

Figure 8:
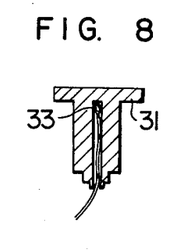
FIG. 8 is a sectional view of a heat reception element shown in FIG. 7.

An additional brief explanation of the overheat protection circuit is given below. When the pan 28 is heated to a high temperature by empty pan heating, heat is conveyed through the top plate 27 and the heat reception element 31 and the resistance of the thermistor 33 changes. This signal is applied to an amplifier, not shown, to drive a relay for disconnecting the power supply to protect the heating coil 29.

As seen from the above construction, according to the present invention, the overheating of the coil can be detected by the simple means of measuring the temperature of the underside of the top plate without requiring the difficult work of mounting the thermistor directly on the heating coil, and the detection is effected under very stable conditions because the heat reception element is kept in close contact with the top plate by the spring. Furthermore, since the detection point is at the center of the hollow section of the heating coil, the temperature detected is not influenced even if the location of the pan somewhat deviates from the center of the coil. In addition, in replacing a failed heating coil, easy servicing is assured because the detection section is separated from the heating coil.

The present invention relates to a protection device which provides protection where the temperature of the heating coil exceeds the allowable limit temperature of the heating coil during operation of the induction heating cooking oven. There may be two such cases; in the first case the empty pan is accidently heated and the radiated heat from the pan is conveyed through the top plate to raise the temperature of the heating coil resulting in deterioration of the insulation between the wires of the coil. In the second case, when a non-magnetic load such as an aluminum pan is used, the effective resistance of the load becomes extremely small resulting in a large current through the heating coil. This current can be more than twice as high as the current which flows when a magnetic pan is used, and the heating coil is heated and finally it is burnt out. For these reasons, it is necessary to protect the heating coil from the radiated heat by the empty pan and from overcurrent.

Figure 9:
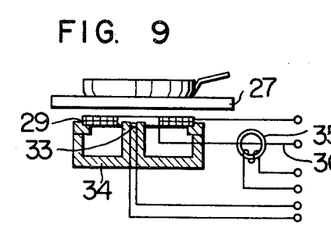
FIG. 9 is a schematic view of an overheat protection device in accordance with another embodiment of the present invention.

Referring to FIG. 9, an example of the protection device is shown which has a top plate 27, a heating coil 29, a heating coil mount 34, a thermistor 33, a current detection coil 35 and a feeder line 36.

An overheating protection device for any thermally abnormal phenomenon caused by the empty pan is first explained. The thermistor for detecting the abnormally high temperature is disposed at the center of the heating coil and near the backside of the top plate 27 and the heating coil 29 in order to assure a high response and precise measurement even when the location of the pan somewhat deviates. The operation is as follows, when the coil environment is heated to a high temperature by the heat radiated from the heated empty pan, the resistance of the thermistor increases, and when the voltage across the thermistor exceeds a reference level which corresponds to the thermistor level at the allowable limit temperature of the heating coil, a stop signal is produced from an oscillation-suppression signal generator 38 (FIG. 10) via a temperature level comparator 37 for stopping the inverter 39.

An overheating protection device for electrically abnormal phenomenon which occurs when the aluminum pan is placed therein resulting in overcurrent through the heating coil, to burn out the coil or cause failure of the insulation, is now explained.

Figure 10:
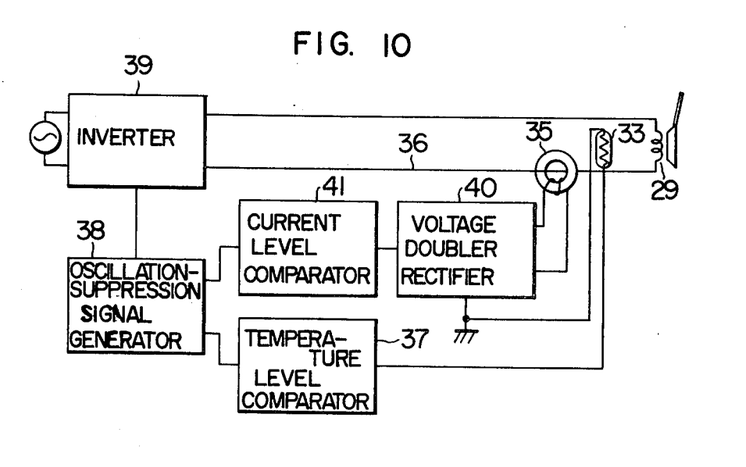
FIG. 10 is a circuit diagram schematically showing the protection function.

As an approach to this protection, an overcurrent may be detected to control the oscillator. In order to detect the current, a small resistance may be inserted or a current transformer may be used. However, considering that a high voltage is being applied to the heating coil, a current detection core 35 is threaded on to the feeder line 36 to the heating coil 29 as shown in FIG. 9 and a current is picked up from a coil wound on the core. The current picked up is rectified in a voltage doubler rectifier 40 as shown in FIG. 10 and the output therefrom is level compared, by a current level comparator 41, with a reference level determined by the maximum allowable heating coil current in the normal operating condition. If the level of the heating coil current exceeds the reference level, the output of the comparator 41 causes the oscillation-suppression signal generator 38 to produce a suppression output for suppressing the oscillation of the inverter 39.

With the above overheating protection device, when a pan such as an empty pan heated to a high temperature is mounted and if the heat radiated therefrom is conveyed to the heating coil to heat the same, the oscillator is caused to stop oscillating at a temperature below the allowable limit temperature of the heating coil so that the heating coil can be cooled. Furthermore, when the aluminum pan is mounted and if an overcurrent flows through the heating coil to generate heat therein, the current through the heating coil is detected to stop the oscillation of the oscillator at a current below the allowable limit current for the heating coil so that the heating coil can be cooled.

Figure 12:
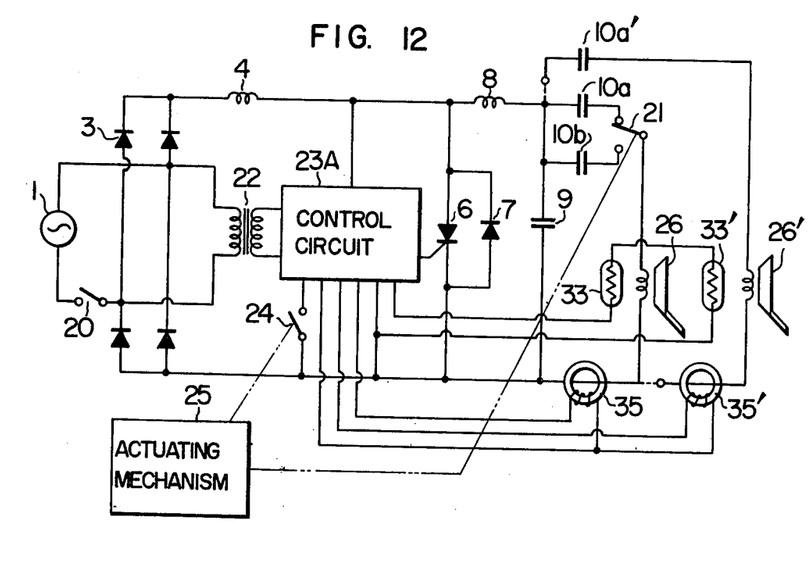
FIG. 12 is a circuit diagram schematically showing another embodiment of the present invention which incorporates various protection devices.

FIG. 12 shows an embodiment which incorporates all of the features of the present invention described above. In FIG. 12, a control circuit 23A may be constructed by appropriately combining the SCR protection circuit shown in FIG. 4, the control circuit 23 shown in FIG. 5 and the control circuit portions 37, 38, 40, 41 for the overheating protection shown in FIG. 10. One example thereof is shown in FIG. 13.

Figure 13:
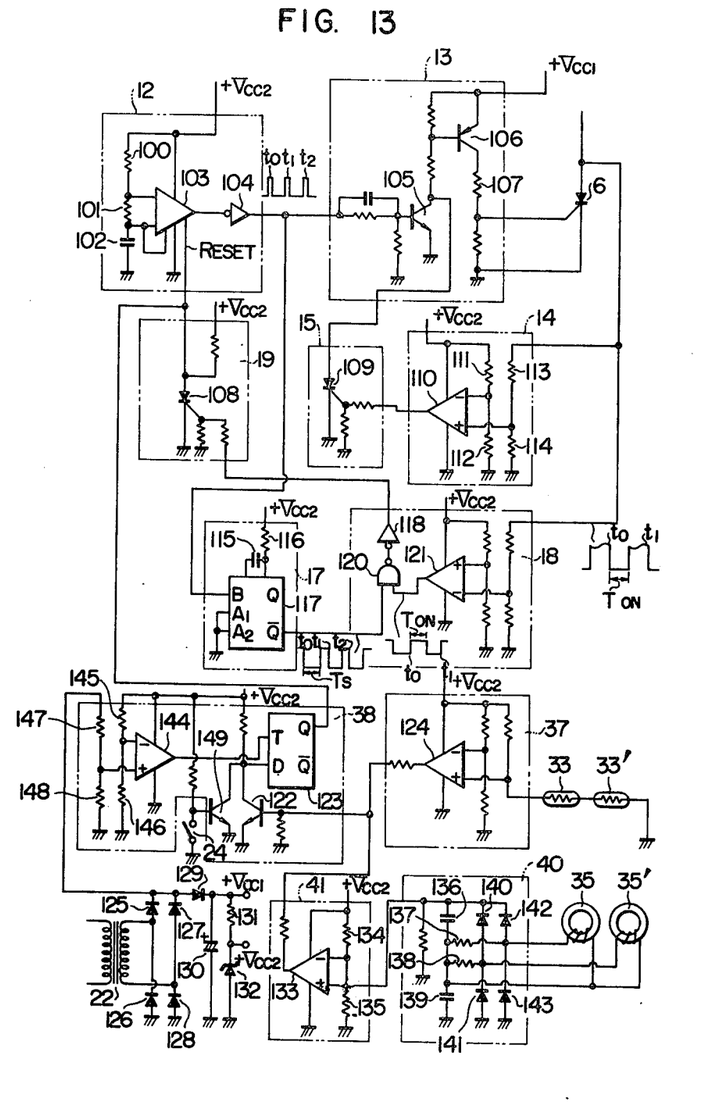
FIG. 13 is a detailed circuit diagram showing one example of the control circuit of FIG. 12.

The control circuit shown in FIG. 13 comprises the gate pulse oscillator circuit 12, the pulse amplifier 13, the SCR abnormal OFF voltage detection circuit 14, the self-holding circuit 15, the reference ON period setting circuit 17, the SCR ON period comparator circuit 18, the self-holding circuit 19, the comparator 37 (for overheat protection), the oscillation-suppression signal generator 38, the voltage doubler rectifier 40, the comparator 41 and an input circuit including the power transformer 22. Those circuits may be easily constructed by those skilled in the art from their intended functions described above, and FIG. 13 shows one example of their detailed circuit diagrams.

The operations of those circuits are briefly explained below.

1. Gate pulse oscillator circuit 12

An oscillating IC 103 has two comparators therein and the oscillation period is determined by the charge and discharge of a capacitor 102. Starting from a condition that the charge of the capacitor 102 is zero, when a power supply $V_{CC2}$ is turned on, the capacitor 102 starts to be charged via resistors 100 and 101. When the charged level reaches the level of the comparator in the IC 103, the output of the comparator changes from H level to L level, and the charge in the capacitor 102 is discharged through the resistor 101 until it reaches the level of the other comparator in the IC 103, when the output changes from the L level to the H level and the capacitor 102 again starts to be charged. The output from the IC 103 is inverted vai a NOT circuit 104 so that a gate pulse waveform as shown is produced.

2. Pulse amplifier 13

The signal generated from the NOT circuit 104 turns on the transistors 105 and 106 when it is at the H level. During the ON period of the transistor 106, the SCR 6 is supplied with a gate current through a resistor 107 so that the SCR 6 is turned on.

3. SCR abnormal OFF voltage detection circuit 14

The anode-cathode voltage of the SCR 6 is shown in the operation waveforms in FIGS. 2 and 3, and the level $d$ (shown in FIGS. 2 and 3) at which a voltage comparator 110 operates is determined by resistors 111 to 114. When the inverter operates normally, the voltage does not reach the protection level $d$ so that the voltage of the SCR divided by resistors 113 and 114 is lower than a reference voltage determined by resistors 111 and 112. Accordingly, the output of a voltage comparator 110 is at the L level. If the OFF voltage of the SCR 6 reaches the protection level $d$ because of commutation failure, the output of the voltage comparator 110 goes to the H level.

4. Self-holding circuit 15

If the OFF voltage of the SCR 6 is normal, the output of the voltage comparator 110 is at the L level and an SCR 109 is not triggered. If the OFF voltage of the SCR 6 rises abnormally and the output of the comparator 110 goes to the H level, the SCR 109 is triggered and it is turned on. As the SCR 109 is turned on, a transistor 106 is forced to turn on applying a continuous D.C. trigger signal to the SCR 6 to block the circuit breaker 2.

5. Reference ON period setting circuit 17

The reference ON period setting circuit 17 triggers a monostable multivibrator IC 117 at the rise of the output from the gate pulse oscillator circuit 12. The operation period of the monostable multivibrator IC 117 is determined by a resistor 116 and a capacitor 115. The set time $T_s$ is shown in the waveform in this drawing.

6. SCR ON period comparator circuit 18

The voltage of the SCR 6 is shaped via a voltage comparator 121 and it is connected to an inverting input of the voltage comparator such that the output of the voltage comparator is at the L level when the SCR 6 is off and at the H level when the SCR 6 is on. The ON period of the SCR 6 is shown by $T_{ON}$ in the waveform in this drawing, and $T_s$ is usually set to be longer than $T_{ON}$ during normal operation. Thus, observing the two inputs to a NAND gate 120 between the times $t_0$ and $t_1$, one input is at the L level between $t_0$ and $t_s$ while the other input is at the L level from the time which is the $T_{ON}$ period after $t_0$ to $t_1$. Considering the condition of $T_s > T_0$, one of the inputs to the NAND gate 120 is at the L level at any time and the output thereof is at the H level. As a result, an output of a NOT circuit 118 is at the L level and the SCR 108 is not triggered. If the ON period $T_{ON}$ of the SCR 6 becomes longer than the set period $T_s$ because of commutation failure, the H level period of the output of the voltage comparator 121 become longer and after the elapse of the set period $T_s$, the two inputs to the NAND gate 120 go to the H level and the NAND gate 120 produces an L level output, the NOT circuit 118 produces an H level output and the SCR 108 is triggered.

7. Self-holding circuit 19

During the normal operation of the inverter, the NOT circuit 118 does not produce an output and the SCR 108 is not triggered. If the ON period of the SCR 6 becomes abnormally long due to commutation failure, the NOT circuit 118 produce an H level output which turns on the SCR 108. As the SCR 108 turns on, a reset terminal of the oscillating IC 103 goes to the L level and the oscillating IC 103 stops oscillating. It also functions to discharge the capacitor 102 for initialization.

8. Temperature level comparator (or overheating protection circuit) 37

The overheating protection circuit 37 consists of a series circuit of thermistors 33 and 33' having positive resistance change characteristic or so-called PTC (positive temperature coefficient) thermistors and a voltage comparator 124. When the temperature of the thermistors 33 and 33' reach their preset temperature, the resistances thereof increase abruptly and the output of the voltage comparator 124 changes from the L level to the H level, and continuously turns on the transistor 122. At normal temperature the voltage comparator 124 does not operate and the output thereof remains at the L level.

9. Oscillation-suppression signal generator 38

The oscillation-suppression signal generator 38 forms a ZVS (zero voltage switch) which oscillates or stops oscillating in synchronism with the zero phase of the commerical power supply 1. A zero volt pulse which is synchronized with the zero phase of the commerical power supply 1 is applied to a T input of a D-type flip-flop 123. When the D input terminal of the D-type flip-flop 123 is changed from the L level to the H level, the output Q goes to the H level at the rise of the next zero volt pulse which is applied to the T input terminal. Thus, the reset of the oscillating IC 103 is released and the oscillating IC 103 starts to oscillate to apply trigger pulses to the SCR 6. The output of the overheating protection circuit 37 described above and outputs of heating coil current detection circuits 40 and 41 to be described later are applied to the transistor 122, and if the inverter is operating normally, the outputs are not produced and the D input terminal of the flip-flop 123 remains at the H level. If abnormal conditions occur, the transistor 122 is turned on. As the transistor 122 is turned on, the oscillating IC 103 is reset at the rise of the next zero volt pulse to the T input terminal, and the inverter is stopped. On the other hand, the generation of the zero volt pulse is effected by a voltage comparator 144, a reference voltage determined by resistors 145 and 146, and resistors 147 and 148 which divide pulsing current from the commercial power supply 1 after being full-wave rectified. The output of the voltage comparator 144 goes to the L level near a zero phase of the commercial power supply 1. The oscillation-suppression control switch 24 is on during the oscillation of the inverter and it is off during the suppression of the oscillation of the inverter. The signal from the switch 24 is inverted via a transistor 149 to control the D input terminal of the D-type flip-flop 123.

10. Voltage doubler rectifier 40

The current through the heating coil 11 or 11' is detected by the current transformer 35 or 35' and it is double-voltage rectified into a D.C. a current by diodes 140 to 143 and capacitors 136 and 139 through load resistors 137 and 138. The rectifier circuit is arranged to detect the largest current in any one of the plurality of heating coils. The voltage doubler is used to detect peak-to-peak value of the heating coil current.

11. Current level comparator 41

In the previous explanation of the oscillation-suppression signal generator 38, the voltage doubler rectifier circuit 40 and the comparator 41 were described as constituting the heating coil current detection circuit. When the output of the voltage doubler rectifier 40 reaches a reference level determined by resistors 134 and 135 of the comparator 41 (that is, if an abnormally large current flows through the heating coil 11 or 11'), the output of the voltage comparator 133 goes to the H level to turn on the transistor 122. The oscillation is thus stopped.

12. Power supply circuit including transformer 22

The power supply circuit full-wave rectifies the output of the transformer 22 by diodes 125 and 128, and produces a 120 Hz pulsing current for a zero volt pulse through an additional diode 129 connected in series. This pulsing current is smoothed by a capacitor 130 to produce $+V_{CC1}$ voltage, and stabilized through a resistor 131 and a Zener diode 132 to supply a stabilized D.C. power supply of $+V_{CC2}$.

What is claimed is:

1. An inverter circuit for energizing an induction heating cooking oven from a power supply having a circuit breaker connected thereto comprising
    a heating coil for generating an A.C. magnetic field;
    a thyristor inverter coupled to said power supply for supplying A.C. power to said heating coil;
    control means for controlling said thyristor inverter; and
    protection means for said thyristor inverter connected to said control means including,
        thyristor conduction period detection means for detecting that the conduction period of said thyristor inverter exceeds a predetermined time period and for generating a signal to be applied to said control means thereby stopping operation of said thyristor inverter without actuating said circuit breaker, and
        voltage detection means for detecting that the voltage applied to said thyristor inverter differs from a predetermined magnitude and for providing a signal to said control means.

2. An inverter circuit for energizing an induction heating cooking oven according to claim 1, wherein said thyristor conduction period detection means of said protection means comprises
    a reference conduction period setting circuit connected to said control means for setting a reference conduction period in response to a gate signal applied by said control means,
    a thyristor conduction period comparator circuit connected to said reference conduction period setting circuit and said thyristor inverter, said thyristor conduction period comparator circuit comparing the conduction period of said thyristor inverter with said reference conduction period for generating an output signal, and
    a self-holding circuit connected to said thyristor conduction period comparator circuit and said control means for generating a signal in response to said output signal from said thyristor conduction period comparator circuit to cause said control means to stop generation of said gate signal.

3. An inverter circuit for energizing an induction heating cooking oven from a power supply having a circuit breaker connected thereto comprising
    a heating coil for generating an A.C. magnetic field;
    a thyristor inverter coupled to said power supply for supplying A.C. power to said heating coil;
    control means for controlling said thyristor inverter; and
    protection means for said thyristor inverter connected to said control means and including,
        thyristor conduction period detection means for detecting that the conduction period of said thyristor inverter differs from a predetermined period and for providing a signal to said control means, and
        voltage detection means for detecting that the OFF voltage of said thyristor inverter exceeds a predetermined magnitude and for applying a D.C. current to a gate of said thyristor through said control means to turn on the thyristor thereby actuating said circuit breaker.

4. An inverter circuit according to claim 3, wherein said voltage detection means comprises
    a thyristor abnormal OFF voltage detection circuit connected to the thyristor for comparing the voltage between the anode and cathode of said thyristor with a predetermined reference voltage and for generating an output signal when the voltage between said anode and cathode of said thyristor exceeds said predetermined reference voltage, and
    a self-holding circuit connected to receive the output signal from said thyristor abnormal OFF voltage detection circuit for applying a D.C. trigger signal through said control means to said thyristor in response to said output signal thereby causing said thyristor to maintain a conduction state.

5. An inverter circuit for energizing an induction heating cooking oven from a power supply having a circuit breaker connected thereto comprising
    a heating coil for generating an A.C. magnetic field,
    a thyristor inverter for supplying A.C. power to said heating coil,
    control means for controlling said thyristor inverter, said control means including a first switch for controlling the start and stop operation of said control means, protection means for said thyristor inverter for detecting commutation failure of said thyristor and applying a suppress signal to said control means to suppress the operation of said inverter, a second switch for said heating coil, and an actuating mechanism which links said first switch for said control means and said second switch for said heating coil to each other such that the operation of said control means switch always occurs in advance of the operation of said heating coil switch.

6. An inverter circuit for energizing an induction heating cooking oven from a power supply having a circuit breaker connected thereto comprising a heating coil for generating an A.C. magnetic field;

a thyristor inverter coupled to said power supply for supplying A.C. power to said heating coil;

control means for controlling said thyristor inverter, said control means including, a gate pulse generator for applying a gate pulse to said thyristor, and an oscillation-suppression signal generator for synchronizing the oscillations of said gate pulse generator with the zero phase portion of the voltage generated by said power supply; and abnormal load detection means for detecting an abnormal current through said heating coil, said abnormal load detection means including, a current transformer electrically coupled to said heating coil, and a comparator for comparing the current detected by said current transformer with a predetermined level and for generating a signal when the detected current exceeds said predetermined level, said comparator thereby stopping the oscillations of said gate pulse generator of said control means in response to the signal from said comparator.

* * * * *